UNITED STATES PATENT OFFICE.

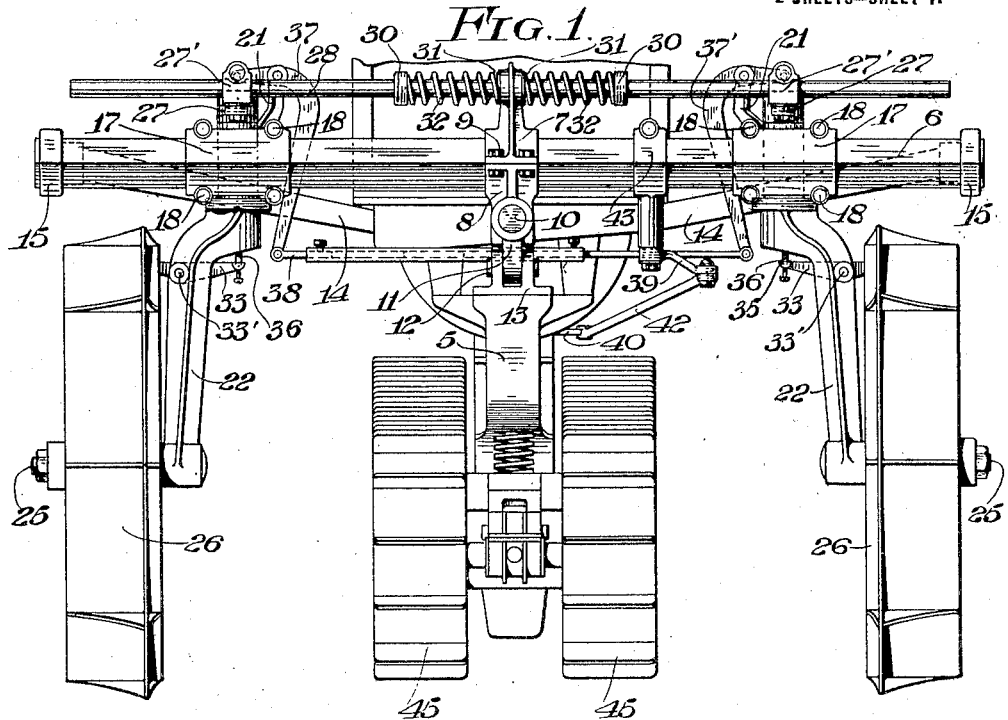
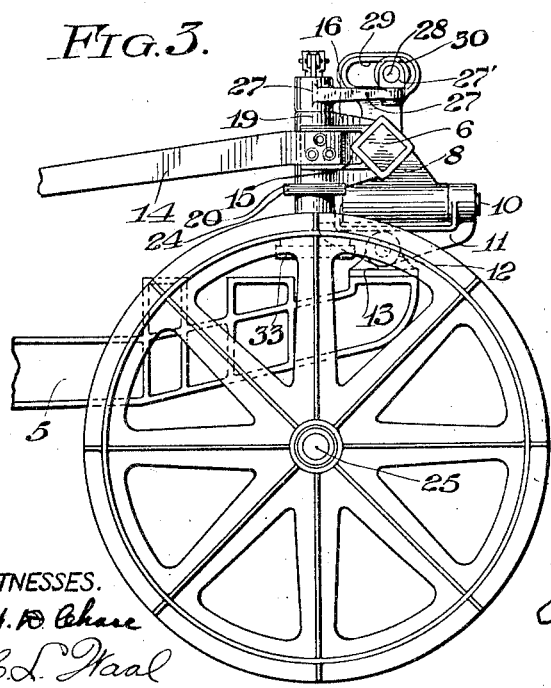
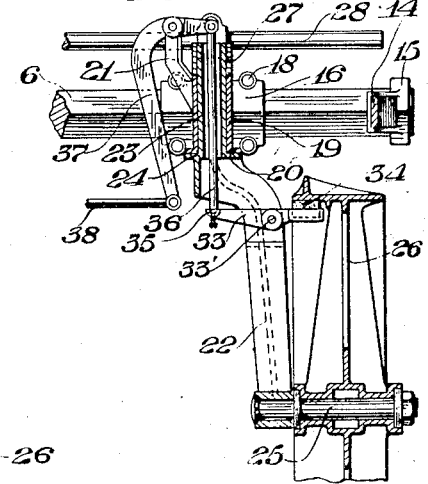

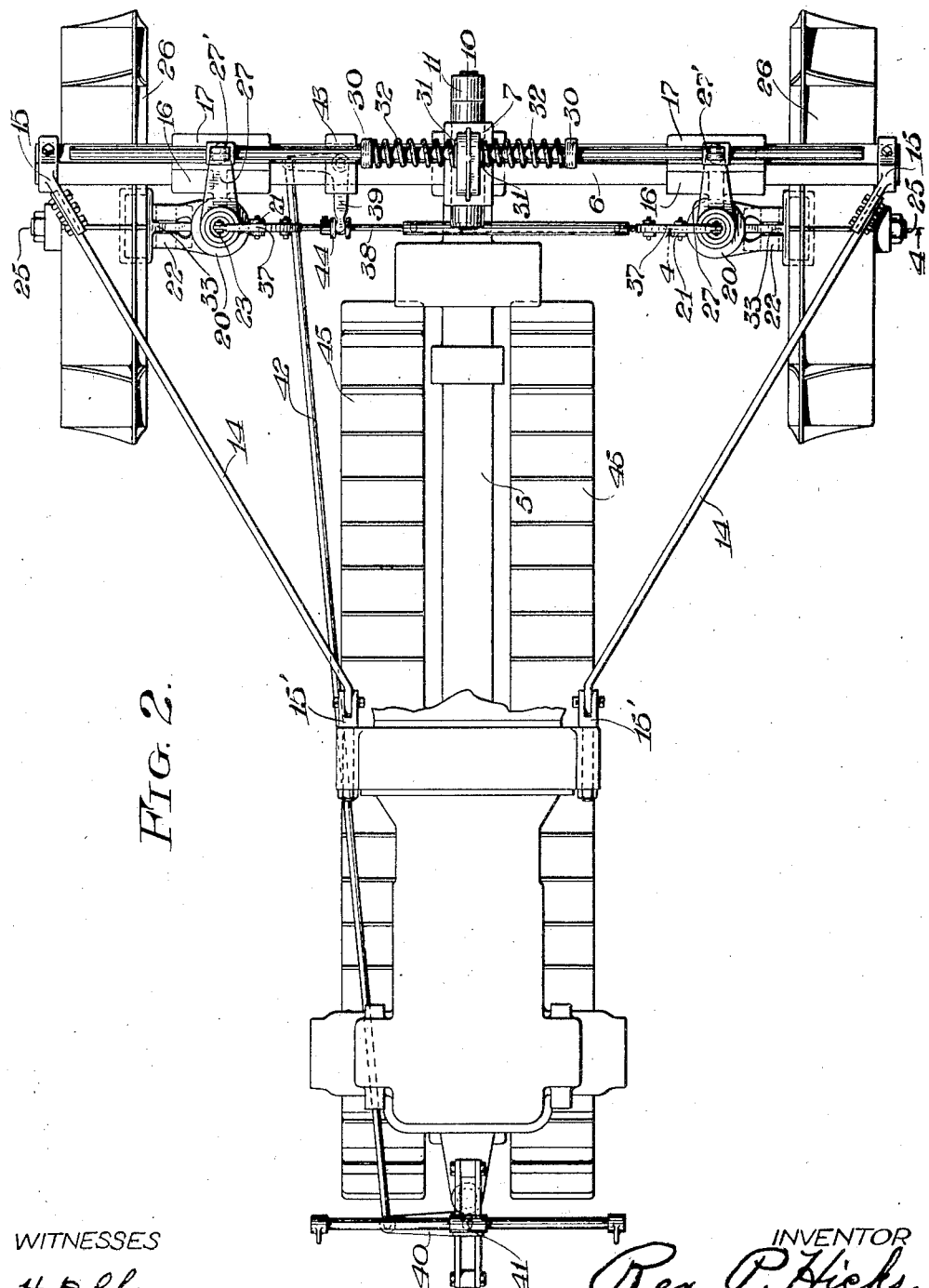

REX P. HICKS, OF MILWAUKEE, WISCONSIN, ASSIGNOR TO HICKS TRACTOR COMPANY, OF MILWAUKEE, WISCONSIN, A CORPORATION OF SOUTH DAKOTA.

STEERING MECHANISM.

1,359,505.     Specification of Letters Patent.     Patented Nov. 23, 1920.

Application filed May 12, 1919. Serial No. 296,342.

*To all whom it may concern:*

Be it known that I, REX P. HICKS, a citizen of the United States, and resident of Milwaukee, in the county of Milwaukee and State of Wisconsin, have invented new and useful Improvements in Steering Mechanism, of which the following is a description, reference being had to the accompanying drawings, which are a part of this specification.

The invention relates to tractors and more particularly to mechanism for steering the tractor.

One of the objects of the present invention is to provide for turning the tractor by locking the inside wheel in making the turn so that the tractor will swing about the wheel and its support to make the turn.

A further object of the invention is to provide simple and effective braking mechanism for the wheels to effect the steering of the tractor.

Another object of the invention is to provide a steering mechanism for tractors in which the steering wheels with their steering brakes are mounted upon a beam which may tilt from side to side when the wheels are traveling over uneven ground without interfering with the steering of the tractor.

The invention further consists in the several features hereinafter set forth and more particularly defined by claims at the conclusion hereof.

In the drawings:

Figure 1 is a front elevation view of the device embodying the invention, parts being broken away; Fig. 2 is a plan view of the steering mechanism; Fig. 3 is a detail side elevation view; Fig. 4 is a section taken on the line 4—4 of Fig. 2.

The numeral 5 refers to the main frame portion of the tractor and 6 a square transversely extending beam or frame member which is connected to the frame 5 by a universal joint connection. This universal joint connection consists of a coupling 7 having its members clamped about the beam by bolts 9, the member 8 pivoted on a pin 10 mounted in a clevis 11 which is pivotally connected intermediate its ends by a pivot bolt 12 to a forked bracket 13 secured to the frame 5. The pin 10 and bolt 12 are disposed at right angles to each other. The coupling 7 is secured centrally of the beam 6 and the pin 10 permits the ends of the beam to be tilted about it while the bolt 12 permits axial movement of the beam so that thrusts may be taken up by thrust rods 14 adjustably secured at one of their ends to the ends of the beam by collars 15 and pivotally connected at their other ends to the rear portion of the tractor by bolts 15'.

The beam 6 is disposed with one of its diagonals vertical and mounted thereon on opposite sides of the coupling 7 are brackets 16 adjustably secured to said beam by clips 17 and bolts 18. These brackets 16 are provided with vertically disposed tubular portions 19 having flanged ends 20 and with supporting arms 21. Forked axle supporting frame members 22 are provided with vertically disposed tubular ends 23 journaled in the tubular portions 19 and with shouldered portions 24 abutting the flanged ends 20.

The members 22 carry stub axles 25 upon which the flanged front wheels 26 of the tractor are mounted. The upper part of the ends 23 project above the portions 19 and have arms 27 secured thereto, and the free ends of said arms are adjustably connected to a connecting rod 28 by collars 27' clamped to the rod and pivotally connected to the arms. The medial portion of the connecting rod is slidably mounted in an elongated slot 29 in the coupling. Collars 30 are fixedly secured to the rod 28 and collars 31 are slidably mounted on said rod and the slotted portion of the coupling and springs 32 are mounted on said rod between each set of collars to maintain said collars 31 against the coupling and to normally resist movement of the rod 28 in either direction and thus normally maintain the wheels 26 at right angles to the main body of the tractor due to the connections of said rod with the wheels through the arms 27 and supports 22. Furthermore, when one of the wheels is turned for steering, the other wheel will be turned with it through the connections just described.

Each wheel 26 is provided with a steering brake consisting of a brake lever 33 pivotally mounted intermediate its ends upon a pin 33' on the forked support 22 and carrying a brake shoe 34 engaging the inner periphery of the wheel 26 and having a socket 35 in its other end. Each brake lever is actuated by a rod 36 and a lever 37. The lever 37 is pivotally mounted intermediate its ends upon the arm 21 of the bracket 16 and is pivotally connected at its upper end to the upper end of the rod 36, the lower end of said rod being moved by said lever 37 into abutting engagement with socket 35 of the lever 33. The lower ends of the lever 37 are connected together by a connecting rod 38 whereby the movement of the rod 38 longitudinally in one direction will apply one of the brakes to its wheel and its movement in the other direction will apply the other brake to its wheel.

The rod 38 is shifted longitudinally to apply the brakes by means of a bell crank lever 39, one arm of which is connected to a crank 40 on a revoluble steering post or control member 41 by a connecting rod 42. The lever 39 is pivotally mounted upon a bracket 43 mounted on the beam 5 and has a forked end engaging a grooved collar 44 adjustably mounted on the rod 38.

It is desirable to adjust the span between the front wheels for using the tractor for different kinds of work and to accomplish this the brackets 16 are adjustable lengthwise of the beam to move the wheels nearer together or farther apart and in order that such adjustment will not affect the steering mechanism the arms 27 are adjustable lengthwise of the rod 28 by shifting the collars 27' and the connecting rod is made up of adjustable telescopic sections so that its length may be varied, and the collar 44 is adjustably mounted on the rod 38. There is enough play in the connection between the rod 42 and the crank 40 to permit tilting of the beam.

The tractor may be propelled by drive wheels or by an endless tread or treads 45 which are more fully shown and described in my application for tractor tread filed May 12, 1919, Serial No. 296,343.

In operation, the tractor is turned by locking one wheel through the application of its brake and thereby causing the tractor as it moves forward to swing the beam 6 and the other front wheel about the vertical pivotal support of the locked wheel and the turning of the unlocked wheel will through the arms 27 and connecting rod 28 turn the support for the locked wheel in the desired direction and on a return of the steering post to neutral position both brakes are in released position and the springs 32 acting upon the rod 28 move the arms 27 to normal position so that the wheels are again running parallel with the frame. For example, referring to Fig. 2, if it is desired to turn to the left, the steering post 41 is turned counter-clockwise together with the arm 40 which through the rod 42 and lever 39 moves the rod 38 to the right, which operates the left hand lever 37 and rod 36 to apply the brake to the left hand wheel. With the left hand wheel thus locked the continual forward movement of the tractor causes it to turn about the left hand bracket 16 as a pivot and as it turns the right hand wheel also turns about its pivot bracket and this turning movement of the right wheel is communicated by the arms 27 and rod 28 to the left hand wheel and after the turn is made the springs 32 act upon the rod 28 to bring the wheels back to normal position.

The invention being capable of expression in other forms than that described, it is not to be limited to the details of construction herein shown, except as specified in the appended claims defining the scope of the invention.

What I claim as new and desire to secure by Letters Patent is:

1. In a tractor, the combination, with the main frame, of a beam tiltably mounted thereon, wheel supports vertically pivotally mounted on said beam in spaced relation, wheels mounted on said supports, wheel steering brakes, and means carried by said beam for operatively connecting said wheel supports together.

2. In a tractor, the combination, with the main frame, of a beam tiltably mounted thereon, wheel supports vertically pivotally mounted on said beam in spaced relation, wheels mounted on said supports, a steering brake for each wheel, means carried by the beam for connecting said brakes together for alternate operation, and means carried by said beam for operatively connecting said wheel supports together.

3. In a tractor, the combination, with a frame member, of wheel supports vertically pivotally mounted thereon, arms on said supports, a rod connecting said arms, spring means acting on said rod to normally maintain said wheel supports in normal position, wheels mounted on said supports, a brake for each wheel mounted on its wheel support, means for alternately applying said brakes, and a control member operatively connected to said brake applying means.

4. In a tractor, the combination of a support provided with spaced apart vertically disposed tubular portions, wheel supports having tubular ends journaled in said tubular portions, wheels mounted on said wheel supports, a brake mounted on each wheel support and engageable with the wheel, a brake rod passing through the tubular end of each wheel support, an operating lever connected to each brake rod, a rod connecting said operating levers together, and means for moving said last named rod.

5. In a tractor, the combination of a support provided with spaced apart vertically disposed tubular portions, wheel supports having tubular ends journaled in said tubular portions, wheels mounted on said wheel supports, a brake mounted on each wheel support and engageable with the wheel carried thereby, a brake rod passing through the tubular end of each wheel support, an operating lever connected to each brake rod, a rod connecting said operating levers together, a steering member, and means operatively connecting said member with said last named rod.

6. In a tractor, the combination of a support provided with spaced apart vertically disposed tubular portions, wheel supports having tubular ends journaled in said tubular portions, wheels mounted on said wheel supports, arms on said wheel supports, a rod connecting said arms, spring means acting on said rod to normally maintain said wheel supports in normal position, a brake mounted on each wheel support and engageable with the wheel carried thereby, a brake rod passing through the tubular end of each wheel support, an operating lever connected to each brake rod, a rod connecting said operating levers together, and means for moving said rod to alternately apply said brakes.

In testimony whereof, I affix my signature, in presence of two witnesses.

REX P. HICKS.

Witnesses:
R. S. C. CALDWELL,
H. D. CHASE.